United States Patent
Hoffmeister et al.

(10) Patent No.: US 7,025,466 B2
(45) Date of Patent: Apr. 11, 2006

(54) PORTABLE LIGHT PROJECTOR UNIT

(75) Inventors: Kurt Hoffmeister, Marshalltown, IA (US); Douglas E. Betts, Albion, IA (US); Brent Redman, Marshalltown, IA (US); Chris Clover, Marshalltown, IA (US); Jeremy Huisman, Ames, IA (US); Michael Hancock, Marshalltown, IA (US); James Gruening, Marshalltown, IA (US)

(73) Assignee: Mechdyne Corporation, Marshalltown, IA (US)

( * ) Notice: Subject to any disclaimer, the term of this patent is extended or adjusted under 35 U.S.C. 154(b) by 0 days.

(21) Appl. No.: 10/413,845

(22) Filed: Apr. 15, 2003

(65) Prior Publication Data

US 2004/0036845 A1    Feb. 26, 2004

Related U.S. Application Data

(60) Provisional application No. 60/372,969, filed on Apr. 15, 2002.

(51) Int. Cl.
*G03B 21/14* (2006.01)
*G03B 21/22* (2006.01)
*G03B 31/04* (2006.01)

(52) U.S. Cl. ............................. 353/119; 353/79; 352/35

(58) Field of Classification Search ................ 353/79, 353/119, 122, 13; 348/744; 352/35; 362/285
See application file for complete search history.

(56) References Cited

U.S. PATENT DOCUMENTS

| | | | | |
|---|---|---|---|---|
| 4,863,275 | A * | 9/1989 | Cormack et al. | 356/612 |
| 4,968,134 | A * | 11/1990 | Shimizu et al. | 353/119 |
| 5,333,434 | A * | 8/1994 | Oberman et al. | 52/645 |
| 5,476,314 | A * | 12/1995 | Nishiki | 312/7.2 |
| 5,580,140 | A * | 12/1996 | Katz et al. | 353/13 |
| 5,622,419 | A * | 4/1997 | Holder et al. | 353/119 |
| 5,639,152 | A * | 6/1997 | Nelson | 353/119 |
| 5,706,074 | A * | 1/1998 | Kohler et al. | 352/35 |
| 5,868,484 | A * | 2/1999 | Chikauchi et al. | 353/119 |
| 6,043,854 | A * | 3/2000 | Scott | 348/744 |
| 6,289,326 | B1 * | 9/2001 | LaFleur | 312/258 |

* cited by examiner

*Primary Examiner*—Melissa Jan Koval
(74) *Attorney, Agent, or Firm*—Brian J. Laurenzo; Michael C. Gilchrist; Jason M. Hunt

(57) ABSTRACT

A rugged portable projector unit is suitable for transport and easy set-up. A projector is mounted to a rigid subframe by a mounting platform. A shock absorbing element is provided between the subframe and the mounting platform. The subframe is mounted within a hardened carrying case. Shock absorbing elements are provided between the subframe and the carrying case. The top of the carrying case is removable. A mirror is hingedly attached to the top of the subframe to reflect images produced by the projector. Access panels and cooling doors are provided in the carrying case to permit access and ventilation to the projector. The carrying case is provided with wheels to allow it to be rolled along the ground. The carrying case is also provided with offset handles on its sides so that the unit naturally tilts to aid in loading and unloading from raised surfaces.

6 Claims, 7 Drawing Sheets

PORTABLE LIGHT PROJECTOR UNIT

This application claims priority from provisional application Ser. No. 60/372,969, filed Apr. 15, 2002.

FIELD OF THE INVENTION

This invention relates to a portable light projector unit. More specifically, the present invention relates to a portable stereoscopic computer graphics display system that facilitates easy transportation and set up.

BACKGROUND OF THE INVENTION

Stereoscopic digital light projectors have numerous uses. In order to take full advantage of these uses, it is desirable to be able to transport the projectors and set them up in remote locations. In the past, this has involved packing the projectors in a box or crate in order to protect it during the transportation process, and then removing the packaging and the projector from the box or crate and setting up the projector. Furthermore, these previous methods of packaging the projector for transportation ended up being bulky and difficult to handle. Furthermore, they did not permit for quick and simple set up of the projector for use after being transported to the desired location. Therefore, there is a need for a system that provides rugged protection for such projectors during transportation, that is convenient and maneuverable, and that can be set up for display quickly and easily. Preferably, the system will be rugged enough to permit shipping by commercial means such as an airline or an overnight carrier, and will be small enough and maneuverable enough for loading and transportation by a minivan or sport utility vehicle.

BRIEF SUMMARY OF THE INVENTION

The present invention relates to a graphics display system that can be conveniently transported and set up for display. A rigid exterior case is provided. Preferably, this rigid case has ergonomically placed handles to aid in lifting and carrying the case, and on one side of the case is provided with caster wheels to allow for wheeling of the unit across generally flat surfaces. A rigid subframe is shock-mounted within the case. Preferably, this subframe is made from a rigid durable materials such as extruded aluminum. A projector is shock-mounted to the subframe, and positioned to project images towards a top of the subframe. A highly reflective surface, such as a mirror, is pivotally mounted to the top of the subframe. This reflective surface is adjustable to a projecting position wherein it is maintained at approximately a forty-five angle to the top of the subframe, such that images projected by the projector will be reflected off the surface at an angle of approximately forty-five degrees, which will be generally parallel with the surface on which the case is sitting. The system can be quickly adjusted into a projecting position by removing a lid from the case and raising the mirror.

DETAILED DESCRIPTION

Figure 1:
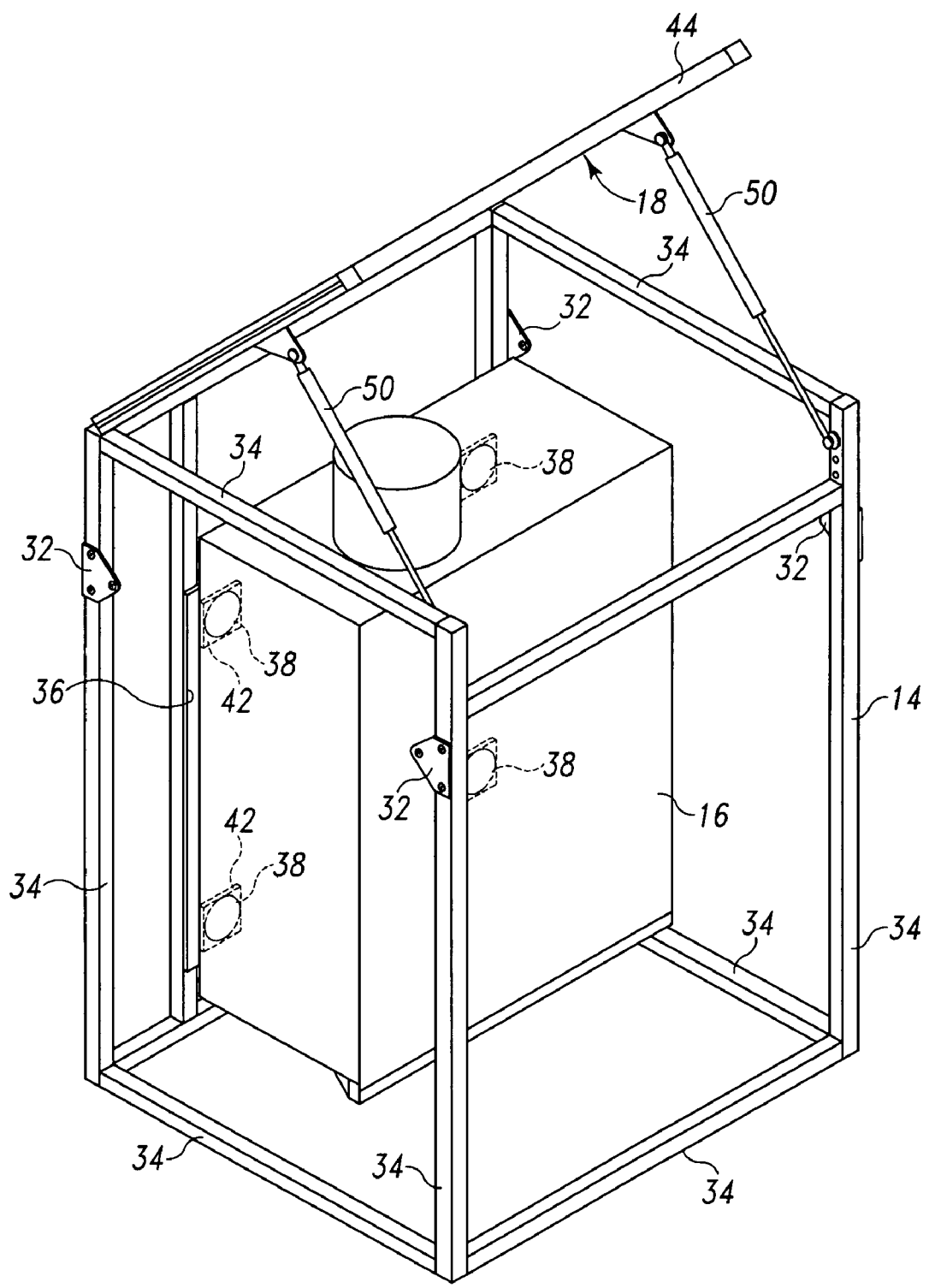
FIG. 1 is an isometric view of preferred embodiment of a subframe and projector according to the present invention, with the unit adjusted to a projecting position.
Figure 2:
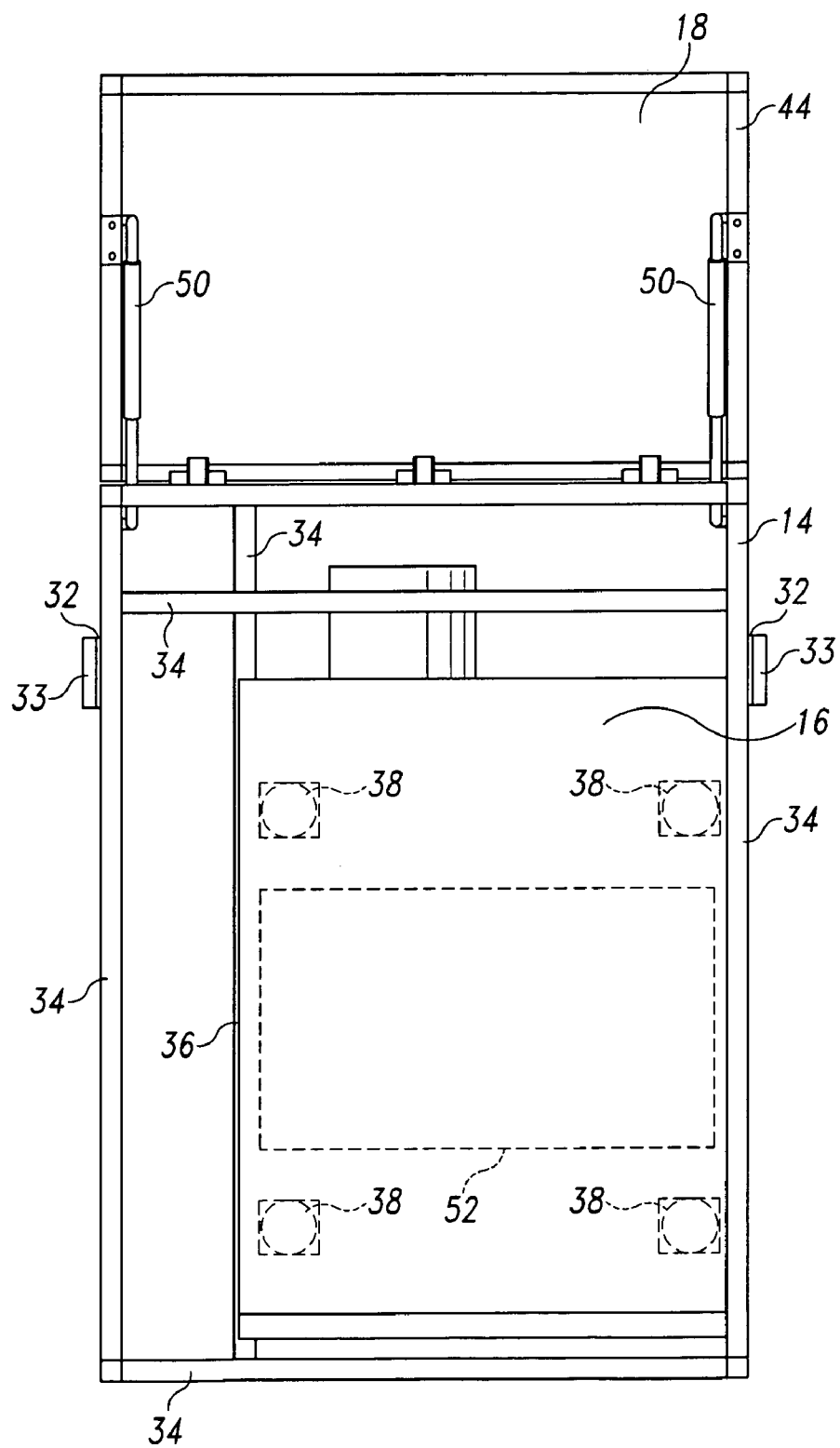
FIG. 2 is a front view of the unit shown in FIG. 1.
Figure 3:
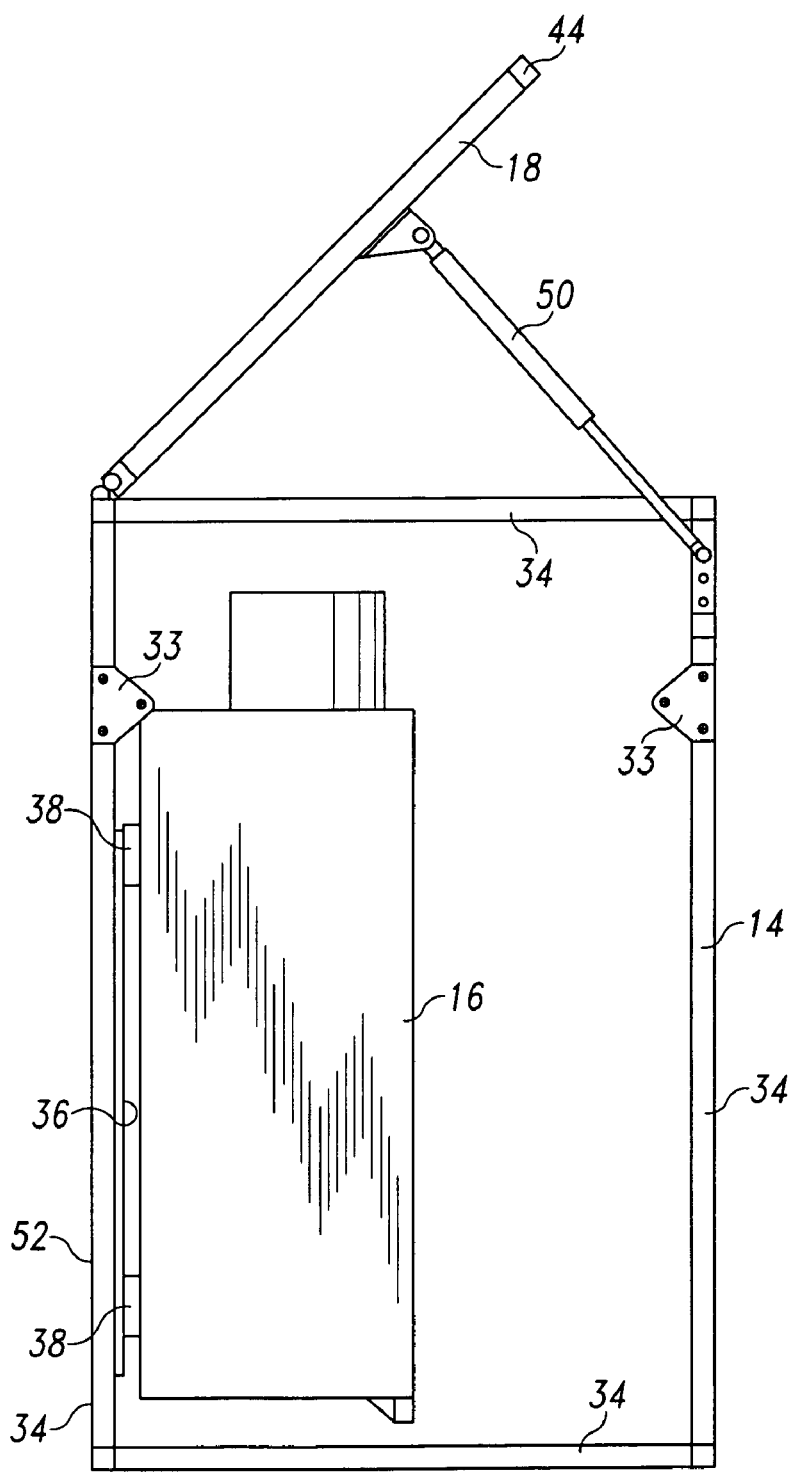
FIG. 3 is a side view of the unit shown in FIG. 1.
Figure 4:
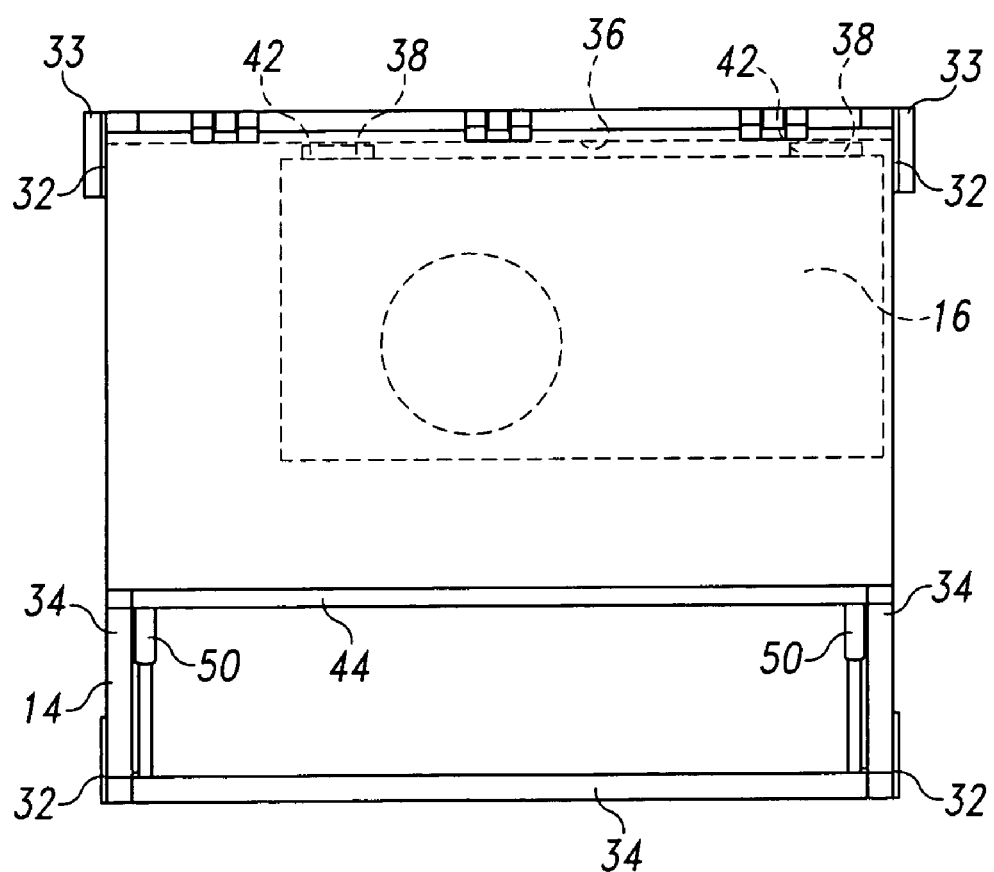
FIG. 4 is a top view of the unit shown in FIG. 1.
Figure 5:
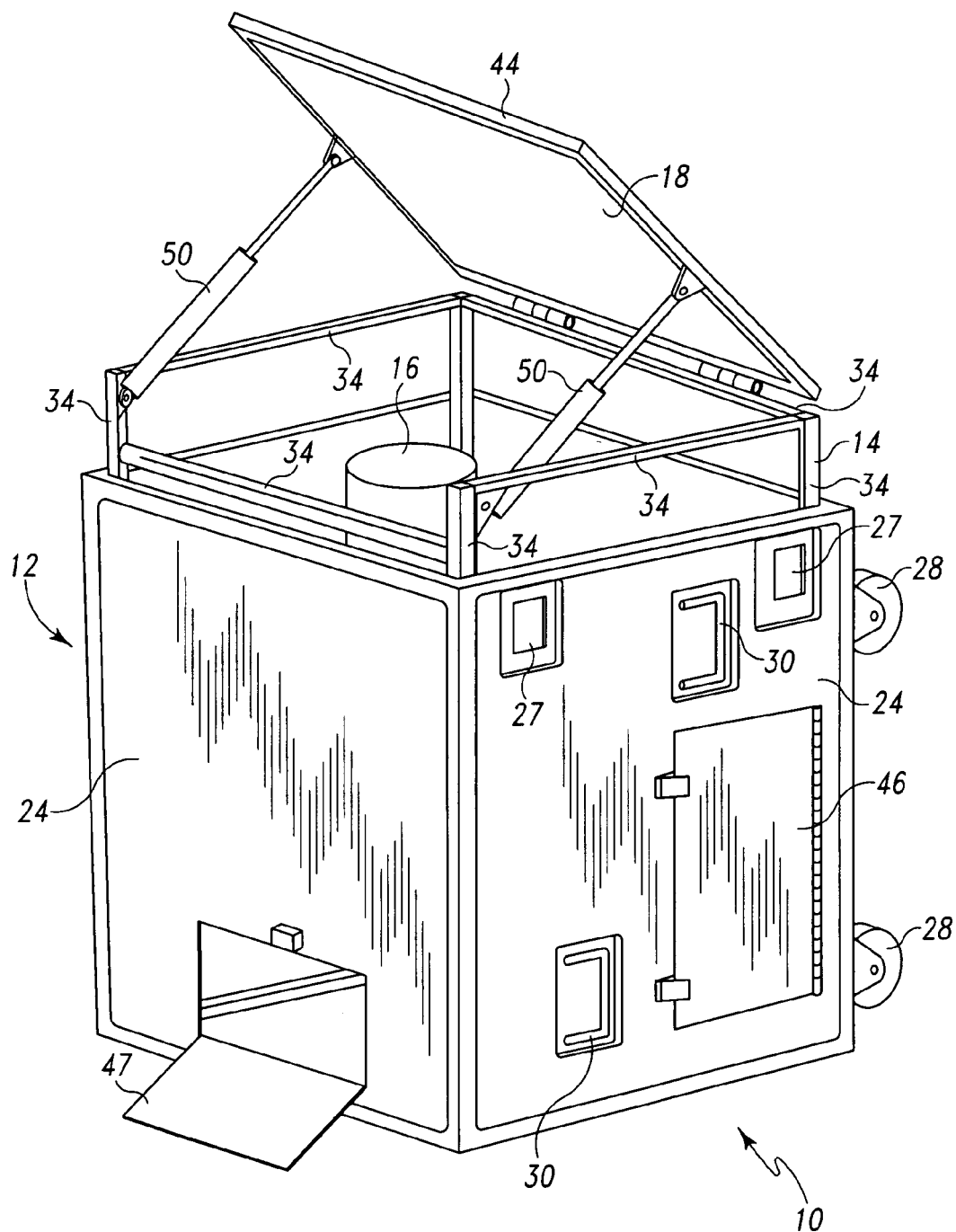
FIG. 5 is an isometric view of the system of the present invention with the lid removed and the unit adjusted to a projecting position.

Shown generally in the Figures is a portable graphic display system 10. The graphic display system 10 comprises essentially a rigid carrying case 12, a subframe 14, a projector 16, and a mirror 18.

Figure 6:
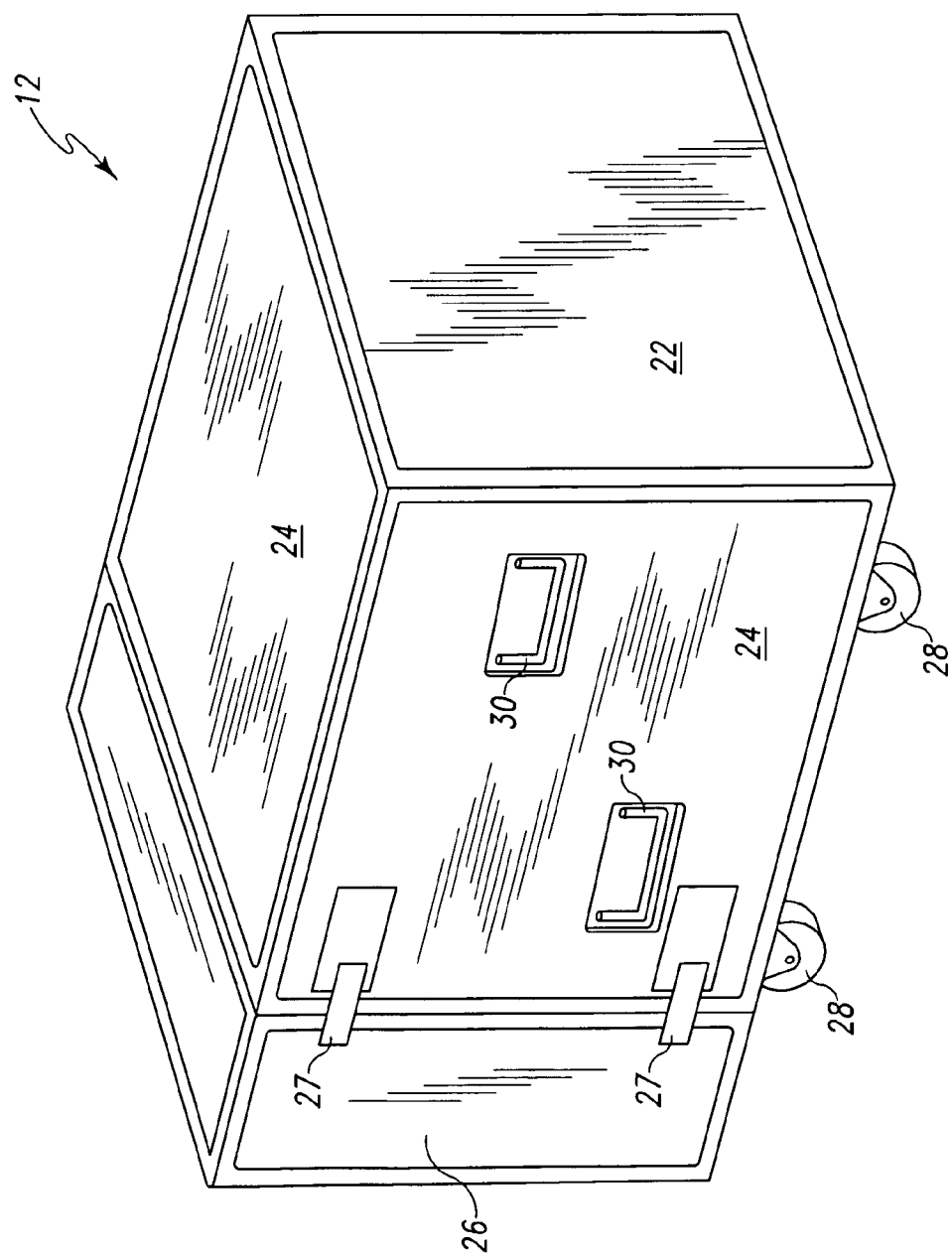
FIG. 6 is an isometric view of the carrying case of the present invention with the lid attached.
Figure 7:
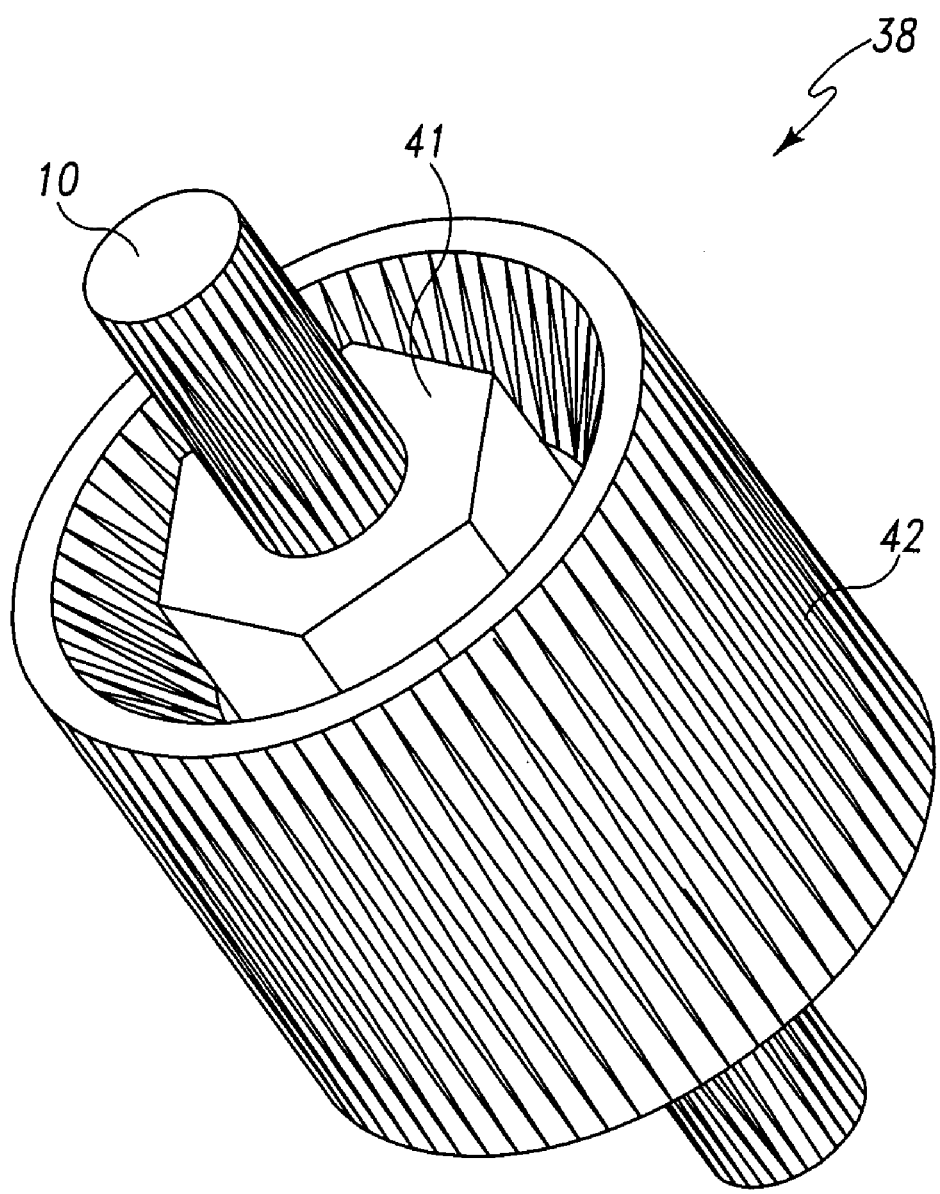
FIG. 7 is an isometric view of the shock absorbing mount used to attach the projector to the sub-frame.

The carrying case 12 is preferably a six-sided rectangular prism. The sides of the case 12 should be formed from a rigid durable material to protect the contents of the case from being invaded. Materials such as hard plastic, vinyl, wood, or metal might be appropriate. It is desirable that the material used be relatively light weight, so as not to add unnecessarily to the overall weight of the system. The case 12 has a top (not shown), a bottom 22, and four sides 24. The bottom 22 of the case 12 is defined as the side that rests on the floor or other supporting surface when the projector 16 is in use. As best seen in FIG. 6, the top portion of the case 12 is a removable lid 26 that latches to the carrying case 12 with latches 27.

Preferably, one side 24 of the case 12 is provided with four caster wheels 28 that permit the case to be maneuvered by rolling it along the floor, ground, or other flat surface. The caster wheels 28 are preferably a renewable phenolic material, or other similar material.

On the two sides 24 of the case 12, that are adjacent to the side with the caster wheels 28, ergonomically placed handles 30 are provided. The handles 30 are provided to help in lifting the case 12 when it is resting on its caster wheels 28. The handles 30 should be offset laterally from each other at approximately a shoulder width, to provide for comfortable and easy lifting. Importantly, the handles should also be offset vertically from each other when the carrying case 12 is resting on the wheels 28 so that the case 12 will naturally tilt while being lifted, if the person doing the lifting has his or her hands level with each other. This tilt of the case 12 makes it easier to load and unload from elevated surfaces such as a sports utility vehicle or minivan. The top and bottom 22 of the case 12 may also be provided with handles 30 to aide in lifting and maneuvering the case 12.

The subframe 14 is shock-mounted to the inside of the case 12. This shock-mounting is accomplished through the use of braces 32 that are bolted to both the case 12 and the subframe 14. A shock absorbing material, such as a rubberized gasket 33 is used between the braces 32 and the inside of the case 12, to provide some shock absorption between the case 12 and the subframe 14. The subframe 14 is comprised of rigid frame members 34 to form a roll cage-like structure inside the case 12. In the preferred embodiment, the frame members 34 are made of extruded aluminum that has been bolted or welded together. Those of ordinary skill in the art will understand that other materials may be used to form the subframe 14.

A projector mounting platform 36 is attached to the subframe 14. Preferably, this mounting platform 36 is attached to the subframe 14 so that it is adjacent to and parallel to the side 24 of the case 12 that has the caster wheels 28 mounted thereon. The projector 16 is then mounted onto the projector mounting platform 36. Shock absorbing mounts 38 are used to attach the projector 16 to the mounting platform 36. Alternatively, the shock absorbing mounts 38 might be placed between the mounting platform 36 and subframe 14. The shock absorbing mounts 38 preferably comprise a bolt 40, a nut 41, and a piece of shock absorbing material 42. The shock absorbing material 42 may be made from a semi-rigid foam rubber, a resilient plastic, or other similar substance. The projector 16 should be mounted so that it is generally centered laterally within the case 12, and so that it will project an image that is generally perpendicular to the surface on which the bottom 22 of the case 12 rests. An additional shock absorbing pad 52, made out of a shock absorbing material, such as Styrofoam or foam rubber, can adhered to the bottom of the mounting platform 36 to provide shock absorbing protection between the mounting platform 36 and the side 24 of the case 12 that has the wheels 28. This pad 52 will prevent the projector 16 and mounting platform 36 from "bottoming out" when the case 12 is being rolled.

A flap 44 with a mirror 18, or other highly reflective surface, fixed to it is hingedly mounted to the top of the subframe 14. It can be adjusted between a closed position which is used for transporting the unit and a projecting position, as shown in the Figures, which is used to project graphic displays. Preferably, gas assisted struts 50 are provided between the subframe 14 and the flap 44. These gas assist struts 50 will maintain the mirror at approximately a 45° angle with respect to the top of the subframe 14, so that an image projected by the projector 16 will be reflected off the mirror generally parallel to the surface on which the bottom 22 of the case 12 rests. It may be desirable to include a clip, or other latching device to hold the flap 44 and mirror 18 in the closed position during transport.

The case 12 may be provided with a cooling door 46 to aide in ventilation of the projector when in use. Similarly, access panels 47 in the form of removable panels or doors may be added to the case 12 to provide access to the projector without removing the projector 16 from the case 12. These are important for attaching power and electronic controls to the projector 16.

It may be desirable to provide a portable display screen for use with the system 10. Alternatively, it may be possible to use the system 10 with an already existing projection screen, or even a wall or other flat surface.

No tools are required to set up or dismantle the system described above. Set up the system 10 for use can generally be done in 15 minutes or less, and dismantling and packing up typically takes no more than 10 minutes. The system 10 is compatible with a wide variety of projectors, screen sizes, and screen materials, including polarity preserving screen materials. For example, the projector may be a front or rear projection device, or can be used without the screen to support projection on any flat surface. The system 10 is also compatible with motion tracking systems. Preferably, the projector 16 will support multiple video sources (such as SGI, SUN, HP, PC, VHS, and DVD) and multiple video inputs (Composite, RCA, DVI, RGBHV, HD-15). The case 12 can be made large enough so that it will provide storage space for documents and other materials such as a laptop computer, or a wireless mouse and keyboard.

The system 10 has been found to be effective in use with a stereoscopic computer graphics display projector, that is commercially available from CHRISTIE DIGITAL SYSTEMS, INC. under the brand name MIRAGE ACTIVE STEREO DLP. For such a projector, the overall dimensions of the subframe 14 are approximately 41 inches in height by 29 inches wide by 26 inches deep. The system 10 should be ATA Category 1 rated and may include a matching shipping container. The overall system 10 weighs approximately 244 pounds. A portable screen may be included with the system 10 with an additional weight of approximately seventy-five pounds. This is a dramatic reduction in weight from prior systems.

To use the system, the carrying case 12, is removed from a transportation vehicle, such as a minivan or a sport utility vehicle using the handles 30. Because the handles 30 on each side 24 are offset vertically from each other, the carrying case 12 will naturally tilt to aid in unloading the carrying case 12. The carrying case 12 can then be moved to where it will be used by rolling it on its wheels 28.

The hard carrying case 12 protects the projector 16 from being damaged during the transportation process. The projectors can be somewhat delicate and sensitive, and can be expensive. The shock absorbing system used to mount the projector 16 in the carrying case 12 is important in protecting these components during transport. By placing a shock absorbing element 33 between the subframe 14 and the carrying case 12, and a shock absorbing element 38 between the projector and the subframe 14, many of the bumps and jolts that occur during transportation are damped.

Once the carrying case 12 has been moved to its desired use location, it can be set up for use in projecting images. The carrying case 12 should be set so that it is resting on its bottom 22, preferable on a generally flat, level, smooth surface. The lid 26 is unlatched from the carrying case 12, and removed. The flap 44 is raised into a projection position, so that it is approximately at a forty-five degree angle with respect to horizontal. The struts 50 hold the flap in place in the projection position.

The access panels 47 and cooling door 46 are opened to provide access to the projector 16. Electricity and computer control can then be attached to the projector 16. A screen is set up in the desired location, generally centered and perpendicularly facing the system 10. When the projector 16 is activated, it projects an image on to the mirror 18. This image is reflected off of the mirror 18 on to the viewing screen. When the viewing is complete, the electricity and computer are unhooked from the projector, the access panels 47 and cooling door 46 closed. The flap 44 can be lowered and clipped into place for transport, and the lid reattached to the carrying case 12.

The carrying case 12 can then be rolled back to the transportation vehicle for transportation. Loading of the carrying case 12 into the transportation vehicle is aided by the ergonomic placement of the handles 30. By placing the lower handles 30 near to the raised surface, the natural lifting action will elevate that end of the carrying case 12 first, which will tilt the carrying case 12 so that the elevated end will slide easily into the minivan or sport utility vehicle with the user's hands relatively level with each other.

The invention claimed is:

1. A portable projector unit comprising:
   (a) a protective shell having a bottom section and a removable top section;
   (b) a subframe mounted to an interior of said bottom section of said protective shell;
   (c) a subframe shock absorbing element between said protective shell and said subframe;
   (d) a projector mounted to said subframe; and
   (e) a projector shock absorbing element between said subframe and said projector.

2. The projector unit according to claim 1, further comprising:
   a mirror hingedly attached to said subframe, said mirror being suitable for reflecting an image projected by said projector.

3. The projector unit according to claim 1, wherein said bottom section has a bottom surface, a first pair of opposed side surfaces, and a second pair of opposed side surfaces; and wherein wheels are mounted on one of said side surfaces from said first pair of opposed side surfaces to permit rolling of the projector unit.

4. The projector unit according to claim 3, wherein both of said opposed side surfaces from said second pair of opposed side surfaces are provided with handles to facilitate carrying said unit.

5. The projector unit according to claim 4, wherein said handles are offset from each other such that when said handles on a single side are level with each other, the projector unit is tipped to aid in loading and unloading from raised surfaces.

6. The projector unit according to claim 1, wherein said top section is a lid;
   wherein said projector unit has a portable configuration wherein said lid is attached to said bottom section; and
   wherein said projector unit has a projecting configuration wherein said lid is removed from said bottom portion so that said projector may project an image to a remote location apart from said projector unit.

* * * * *